(12) United States Patent
Zhang et al.

(10) Patent No.: US 12,149,717 B2
(45) Date of Patent: *Nov. 19, 2024

(54) HYBRID CODING ORDER FOR POINT CLOUD CODING

(71) Applicant: TENCENT AMERICA LLC, Palo Alto, CA (US)

(72) Inventors: Xiang Zhang, Sunnyvale, CA (US); Wen Gao, West Windsor, NJ (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,538

(22) Filed: Nov. 30, 2022

(65) Prior Publication Data

US 2023/0090436 A1 Mar. 23, 2023

Related U.S. Application Data

(63) Continuation of application No. 17/494,755, filed on Oct. 5, 2021, now Pat. No. 11,582,469, which is a
(Continued)

(51) Int. Cl.
*H04N 19/20* (2014.01)
*H04N 19/103* (2014.01)
(Continued)

(52) U.S. Cl.
CPC .......... *H04N 19/20* (2014.11); *H04N 19/103* (2014.11); *H04N 19/136* (2014.11); *H04N 19/184* (2014.11)

(58) Field of Classification Search
CPC .... H04N 19/20; H04N 19/103; H04N 19/136; H04N 19/184
See application file for complete search history.

(56) References Cited

U.S. PATENT DOCUMENTS

| 2012/0176381 | A1* | 7/2012 | Park | G06T 13/20 |
| 2013/0034171 | A1* | 2/2013 | Winken | H04N 19/96 |
| | | | | 375/E7.026 |
| 2016/0071312 | A1* | 3/2016 | Laine | G06T 15/08 |
| | | | | 345/419 |
| 2017/0353721 | A1* | 12/2017 | Piao | H04N 19/119 |

(Continued)

FOREIGN PATENT DOCUMENTS

| CA | 3096452 A1 | 10/2019 |
| CA | 3098586 A1 | 11/2019 |

(Continued)

OTHER PUBLICATIONS

3DG, "G-PCC codec description v4," International Organisation For Standardisation, Organisation Internationale De Normalisation, ISO/IEC JTC1/SC29/WG11, Coding of Moving Pictures and Audio, ISO/IEC JTC1/SC29iWG11, Document: N18673, Gothenburg, SE, Jul. 2019, 63 pages.

(Continued)

*Primary Examiner* — Mohammed S Rahaman
(74) *Attorney, Agent, or Firm* — ArentFox Schiff LLP

(57) ABSTRACT

An apparatus for point cloud coding, includes processing circuitry that receives a coded bitstream for a point cloud. The coded bitstream includes encoded data for nodes in an octree structure for the point cloud corresponding to three dimensional (3D) partitions of a space of the point cloud, node sizes of the nodes being associated with sizes of the corresponding 3D partitions of the nodes. The processing circuitry decodes, from the coded bitstream, a first set of occupancy codes for a first set of nodes in the nodes using a first coding order and a second set of occupancy codes for a second set of nodes in the nodes using a second coding order that is different from the first coding order. Further, the processing circuitry reconstructs the octree structure based on at least the first set of occupancy codes and the second set of occupancy codes.

13 Claims, 18 Drawing Sheets

Related U.S. Application Data continuation of application No. 17/063,411, filed on Oct. 5, 2020, now Pat. No. 11,223,836.

(60) Provisional application No. 62/942,549, filed on Dec. 2, 2019.

(51) Int. Cl.
*H04N 19/136* (2014.01)
*H04N 19/184* (2014.01)

(56) References Cited

U.S. PATENT DOCUMENTS

| | | | |
|---|---|---|---|
| 2019/0080483 A1* | 3/2019 | Mammou | H04N 19/593 |
| 2019/0081638 A1* | 3/2019 | Mammou | H03M 7/30 |
| 2020/0413080 A1 | 12/2020 | Lasserre et al. | |
| 2021/0012538 A1* | 1/2021 | Wang | G06T 9/00 |
| 2022/0038751 A1* | 2/2022 | Yano | H04N 19/21 |
| 2022/0159310 A1* | 5/2022 | Oh | H04N 19/136 |

FOREIGN PATENT DOCUMENTS

| | | |
|---|---|---|
| WO | 2019140510 A1 | 7/2019 |
| WO | 2019203297 A1 | 10/2019 |
| WO | 2019/216434 A1 | 11/2019 |

OTHER PUBLICATIONS

Gumhold et al., "Predictive Point-Cloud Compression," Jul. 2005, 1 page.

International Search Report and Written Opinion in PCT/US2020/054600, mailed Jan. 22, 2021, 12 pages.

ISO/IEC 23090-9:2019(E), "Information technology-MPEG-I (Coded Representation of Immersive Media)—Part 9: Geometry-based Point Cloud Compression," CD Stage, Geneva, CH, 2019, 104 pages.

Mekuria et al., "Requirements for Point Cloud Compression," International Organisation for Standardisation Organisation, Internationale De Normalisation, ISO/IEC JTC1/SC29/WG11, Coding of Moving Pictures and Audio, ISO/IEC JTC1/SC29/WG11, MPEG2016/n16330, Geneva, CH, Feb. 2016, 3 pages.

Tulvan et al., "Use Cases for Point Cloud Compression (PCC)," International Organisation for Standardisation Organisation, Internationale De Normalisation, ISO/IEC JTC1/SC29/WG11, Coding of Moving Pictures and Audio, ISO/IEC JTC1/SC29/WG11, MPEG2015/ N16331, Geneva, CH, Jun. 2016, 8 pages.

1 Singaporean Search Report and Written Opinion issued Jan. 13, 2023 in Application No. 11202110885V, 5 pages.

Supplementary European Search Report mailed Nov. 28, 2023 in Application No. 20896902.2, 12 pages.

Cai Kangying et al: "Probability Model-Adaptive Coding of Point Clouds with Octree Decomposition", 116. MPEG Meeting; Oct. 14, 2016-Oct. 21, 2016; Chengdu; (Motion Picture Expert Group or ISO/IEC JTC1 /SC29/ WG11 ), Oct. 10, 2016, pp. 1-5.

Office Action received for Korean Patent Application No. 10-2021-7031707, mailed on Jun. 18, 2024 (6 pages of English Translation and 5 pages of Original Document).

Office Action received for Chinese Patent Application No. 202080038882.4, mailed on Sep. 23, 2024, 41 pages (27 pages of English Translation and 14 pages of Official copy only).

* cited by examiner

| geometry_parameter_set( ) { | Descriptor |
|---|---|
|   gps_geom_parameter_set_id | ue(v) |
|   gps_seq_parameter_set_id | ue(v) |
|   gps_box_present_flag | u(1) |
|   if( gps_box_present_flag ){ | |
|     gps_gsh_box_log2_scale_present_flag | u(1) |
|     if( gps_gsh_box_log2_scale_present_flag == 0 ) | |
|       gps_gsh_box_log2_scale | ue(v) |
|   } | |
|   unique_geometry_points_flag | u(1) |
|   neighbour_context_restriction_flag | u(1) |
|   inferred_direct_coding_mode_enabled_flag | u(1) |
|   bitwise_occupancy_coding_flag | u(1) |
|   adjacent_child_contextualization_enabled_flag | u(1) |
|   log2_neighbour_avail_boundary | ue(v) |
|   log2_intra_pred_max_node_size | ue(v) |
|   log2_trisoup_node_size | ue(v) |
|   gps_depth_first_node_size_log2_minus_1 | ue(v) |
|   gps_extension_present_flag | u(1) |
|   if( gps_extension_present_flag ) | |
|     while( more_data_in_byte_stream( ) ) | |
|       gps_extension_data_flag | u(1) |
|   byte_alignment( ) | |
| } | |

FIG. 13

| geometry_parameter_set( ) { | Descriptor |
|---|---|
| gps_geom_parameter_set_id | ue(v) |
| ... | ... |
| log2_trisoup_node_size | ue(v) |
| gps_hybrid_coding_order_flag | u(1) |
| if ( gps_hybrid_coding_order_flag ) | |
| gps_depth_first_node_size_log2_minus_2 | ue(v) |
| ... | ... |
| byte_alignment( ) | |
| } | |

*FIG. 14*

| geometry_slice_data( ) { | Descriptor |
|---|---|
|   for( depth = 0; depth < MaxGeometryOctreeDepth; depth++ ) { | |
|     for( nodeIdx = 0; nodeIdx < NumNodesAtDepth[ depth ]; nodeIdx++ ) { | |
|       xN = NodeX[ depth ][ nodeIdx ] | |
|       yN = NodeY[ depth ][ nodeIdx ] | |
|       zN = NodeZ[ depth ][ nodeIdx ] | |
|       if ( depth >= MaxGeometryOctreeDepth − $d_t$ ) { | |
|         geometry_node_depth_first ( depth, nodeIdx, xN, yN, zN ) | |
|       } else { | |
|         geometry_node( depth, nodeIdx, xN, yN, zN ) | |
|       } | |
|     } | |
|   } | |
|   if ( log2_trisoup_node_size > 0 ) | |
|     geometry_trisoup_data( ) | |
| } | |

*FIG. 15*

| Descriptor |
|---|
| geometry_node_depth_first ( depth, nodeIdx, xN, yN, zN ) { |
| if( depth >= MaxGeometryOctreeDepth-1 ) { |
| return |
| } |
| geometry_node ( depth, nodeIdx, xN, yN, zN ) |
| nodeIdx = NumNodesAtDepth[ depth + 1 ] |
| for( child = 0; child < GeometryNodeChildrenCnt; child++ |
| ) { |
| childIdx = GeometryNodeChildren[ child ] |
| x = 2 × xN + ( childIdx & 4 == 1 ) |
| y = 2 × yN + ( childIdx & 2 == 1 ) |
| z = 2 × zN + ( childIdx & 1 == 1 ) |
| geometry_node_depth_first ( depth+1, nodeIdx, x, y, z ) |
| nodeIdx++ |
| } |
| NumNodesAtDepth[ depth + 1 ] = nodeIdx |
| } |

*FIG. 16*

HYBRID CODING ORDER FOR POINT CLOUD CODING

INCORPORATION BY REFERENCE

This application is a continuation of U.S. patent application Ser. No. 17/494,755, filed on Oct. 5, 2021, which is a continuation of U.S. patent application Ser. No. 17/063,411, filed on Oct. 5, 2020, now U.S. Pat. No. 11,223,836, which claims the benefit of priority to U.S. Provisional Application No. 62/942,549, "HYBRID CODING ORDER FOR POINT CLOUD CODING" filed on Dec. 2, 2019. The entire content and disclosure of each of which is incorporated by reference herein in its entirety.

TECHNICAL FIELD

The present disclosure describes embodiments generally related to point cloud coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. Point clouds can be used as a 3D representation of the world. A point cloud is a set of points in a 3D space, each with associated attributes, e.g. color, material properties, texture information, intensity attributes, reflectivity attributes, motion related attributes, modality attributes, and various other attributes. Such point clouds may include large amounts of data and may be costly and time-consuming to store and transmit.

SUMMARY

Aspects of the disclosure provide methods and apparatuses for point cloud compression and decompression. In some examples, an apparatus for point cloud compression/decompression includes processing circuitry. In some embodiments, the processing circuitry receives, from a coded bitstream for a point cloud, encoded occupancy codes for nodes in an octree structure for the point cloud. The nodes in the octree structure correspond to three dimensional (3D) partitions of a space of the point cloud. Sizes of the nodes are associated with sizes of the corresponding 3D partitions. Further, the processing circuitry decodes, from the encoded occupancy codes, occupancy codes for the nodes. At least a first occupancy code for a child node of a first node is decoded without waiting for a decoding of a second occupancy code for a second node having a same node size as the first node. Then, the processing circuitry reconstructs the octree structure based on the decoded occupancy codes for the nodes, and reconstructs the point cloud based on the octree structure.

In some embodiments, the processing circuitry decodes a first set of occupancy codes for a first set of nodes in a first sub octree with the first node being a root of the first sub octree and decodes a second set of occupancy codes for a second set of nodes in a second sub octree with the second node being a root of the second sub octree. In an embodiment, the processing circuitry decodes the first set of occupancy codes for the first set of nodes in the first sub octree in parallel with the second set of occupancy codes for the second set of nodes in the second sub octree.

In another embodiment, the processing circuitry decodes, using a first coding mode, the first set of occupancy codes for the first set of nodes in the first sub octree and decodes, using a second coding mode, second set of occupancy codes for the second set of nodes in the second sub octree. In an example, the processing circuitry decodes, from the coded bitstream, a first index that is indicative of the first coding mode for the first sub octree, and decodes, from the coded bitstream, a second index that is indicative of the second coding mode for the second sub octree.

In some embodiments, the processing circuitry decodes a first portion of occupancy codes for larger nodes in the nodes using a first coding order. The larger nodes are larger than a specific node size for coding order change. The processing circuitry decodes a second portion of occupancy codes for smaller nodes in the nodes using a second coding order that is different from the first coding order. The smaller nodes are equal or smaller than the specific node size for coding order change. In an example, the first coding order is breadth first coding order and the second coding order is depth first coding order. In another example, the first coding order is depth first coding order and the second coding order is breadth first coding order.

In some examples, the processing circuitry determines the specific node size for coding order change based on a signal in the coded bitstream for the point cloud. In an example, the processing circuitry decodes a control signal from the coded bitstream for the point cloud, and the control signal is indicative of a change of coding order. Then, the processing circuitry decodes the signal and determines the specific node size for coding order change.

Aspects of the disclosure also provide a non-transitory computer-readable medium storing instructions which when executed by a computer for point cloud encoding/decoding cause the computer to perform any one or a combination of the methods for point cloud encoding/decoding.

BRIEF DESCRIPTION OF THE DRAWINGS

Further features, the nature, and various advantages of the disclosed subject matter will be more apparent from the following detailed description and the accompanying drawings in which:

FIG. 13 shows a syntax example of geometry parameter set according to some embodiments of the disclosure.

FIG. 14 shows another syntax example of geometry parameter set according to some embodiments of the disclosure.

FIG. 15 shows a pseudo code example for octree coding according to some embodiments of the disclosure.

FIG. 16 shows a pseudo code example for depth first coding order according to some embodiments of the disclosure.

DETAILED DESCRIPTION OF EMBODIMENTS

Figure 1:
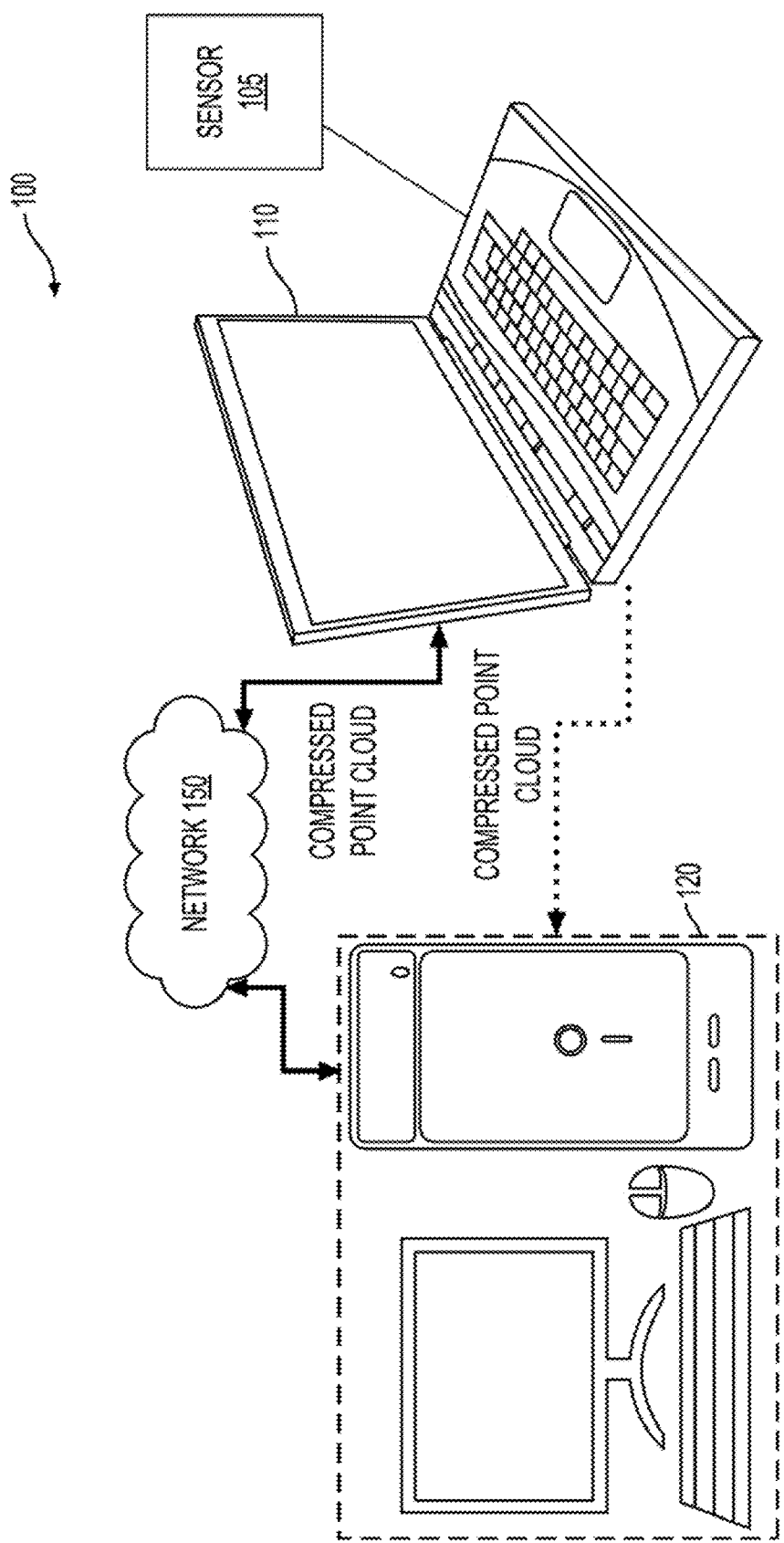
FIG. 1 is a schematic illustration of a simplified block diagram of a communication system in accordance with an embodiment.

Aspects of the disclosure provide point cloud coding (PCC) techniques. PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. Moving picture experts group (MPEG) is working on G-PCC standard and V-PCC standard that respectively using the G-PCC scheme and the V-PCC scheme.

Aspects of the disclosure provide techniques for a hybrid coding order that can be used in PCC, such as the G-PCC scheme and the V-PCC scheme. The hybrid coding coder can include the depth first traverse scheme and breadth first traverse scheme in a coding order. The present disclosure also provides techniques for signaling the coding order.

Point Clouds can be widely used in many applications. For example, point clouds can be used in autonomous driving vehicles for object detection and localization; point clouds can be used in geographic information systems (GIS) for mapping, and can be used in cultural heritage to visualize and archive cultural heritage objects and collections, etc.

Hereinafter, a point cloud generally may refer to a set of points in a 3D space, each with associated attributes, e.g. color, material properties, texture information, intensity attributes, reflectivity attributes, motion related attributes, modality attributes, and various other attributes. Point clouds can be used to reconstruct an object or a scene as a composition of such points. The points can be captured using multiple cameras, depth sensors or Lidar in various setups and may be made up of thousands up to billions of points in order to realistically represent reconstructed scenes. A patch generally may refer to a contiguous subset of the surface described by the point cloud. In an example, a patch includes points with surface normal vectors that deviate from one another less than a threshold amount.

Compression technologies can reduce the amount of data required to represent a point cloud for faster transmission or reduction of storage. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, and the like.

According to an aspect of the disclosure, the main philosophy behind V-PCC is to leverage existing video codecs to compress the geometry, occupancy, and texture of a dynamic point cloud as three separate video sequences. The extra metadata needed to interpret the three video sequences are compressed separately. A small portion of the overall bitstream is the metadata, which could be encoded/decoded efficiently using software implementation. The bulk of the information is handled by the video codec.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, and/or the Internet. For the purposes of the present discussion, the architecture and topology of the network (150) may be immaterial to the operation of the present disclosure unless explained herein below.

Figure 2:
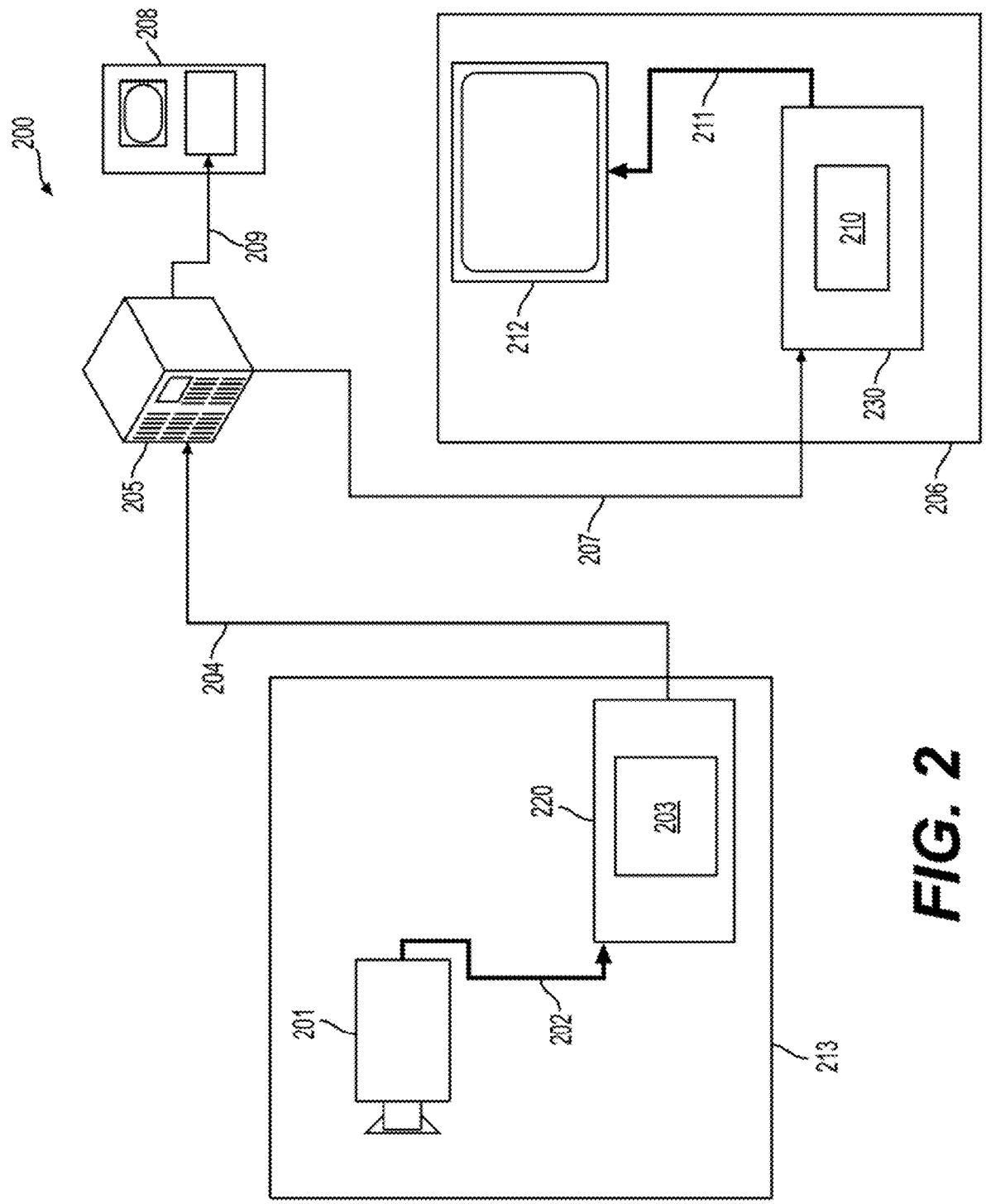
FIG. 2 is a schematic illustration of a simplified block diagram of a streaming system in accordance with an embodiment.

FIG. 2 illustrates a simplified block diagram of a streaming system (200) in accordance with an embodiment. The FIG. 2 example is an application for the disclosed subject matter for a point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
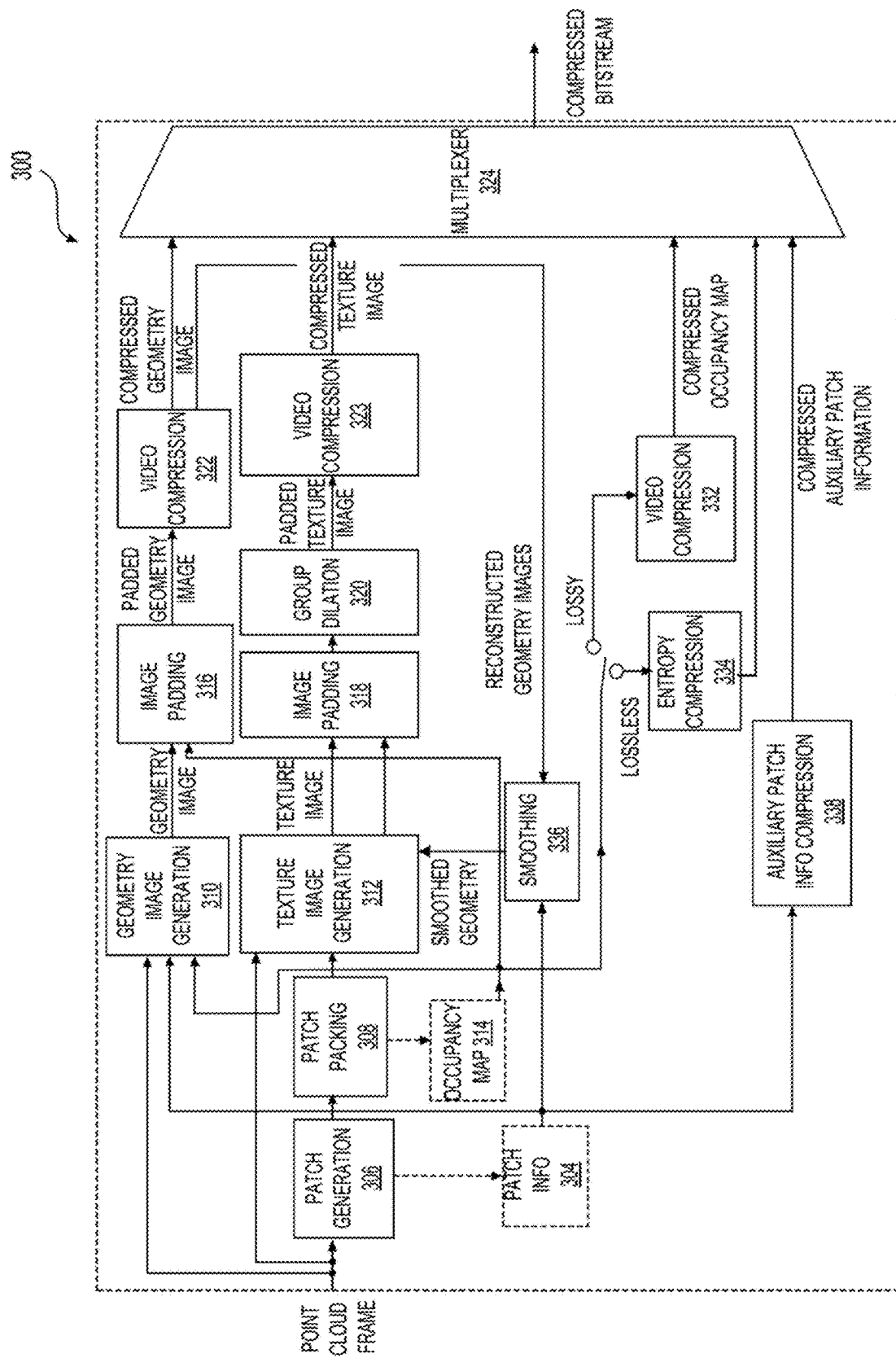
FIG. 3 shows a block diagram of an encoder for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into an image-based representation along with some meta data (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

The patch info module (304) can collect the patch information that indicates sizes and shapes of the patches. In some examples, the patch information can be packed into an image frame and then encoded by the auxiliary patch info compression module (338) to generate the compressed auxiliary patch information.

The patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
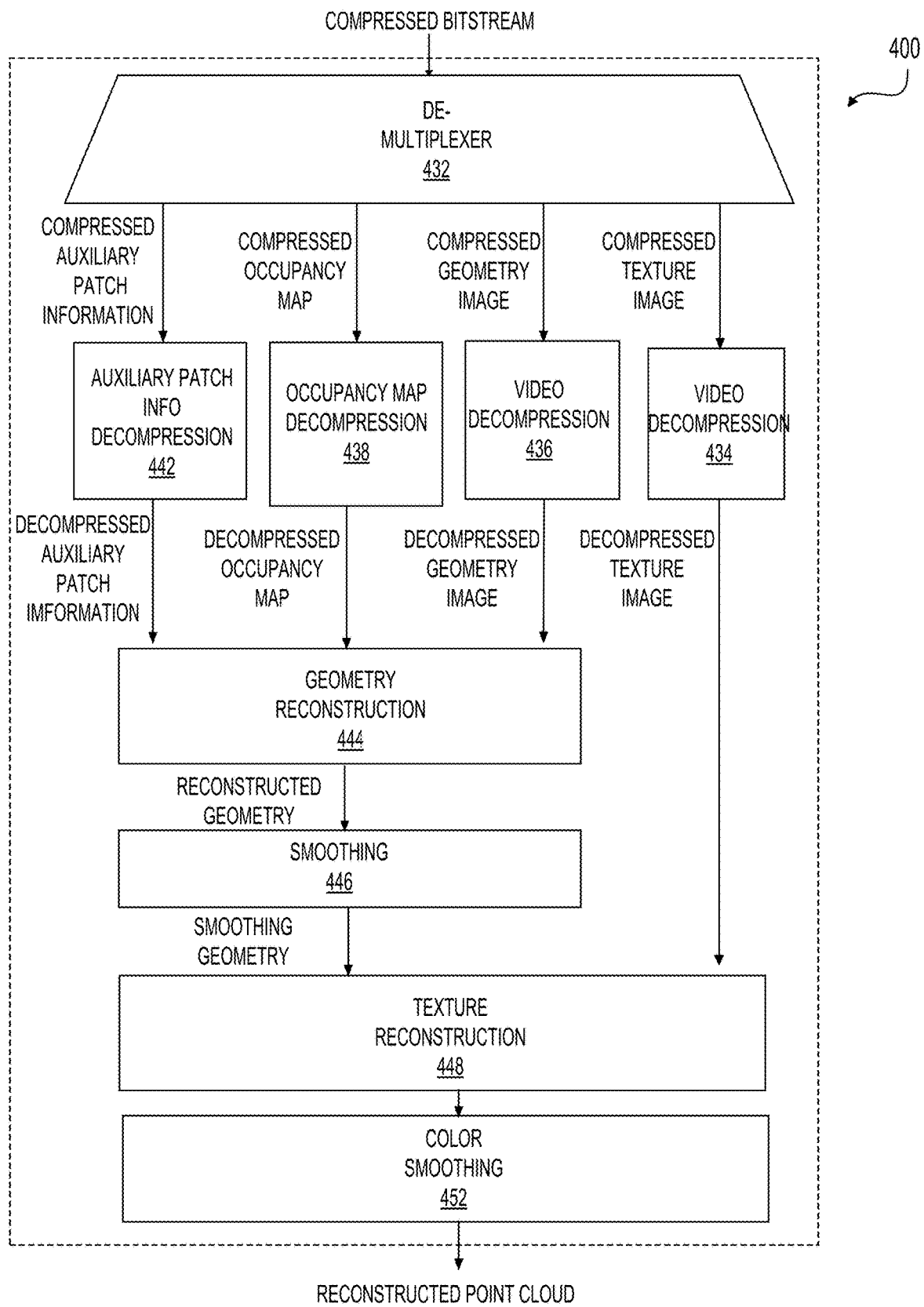
FIG. 4 shows a block diagram of a decoder for decoding a compressed bitstream corresponding to point cloud frames according to some embodiments.

FIG. 4 shows a block diagram of a V-PCC decoder (400) for decoding compressed bitstream corresponding to point cloud frames, according to some embodiments. In some embodiments, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
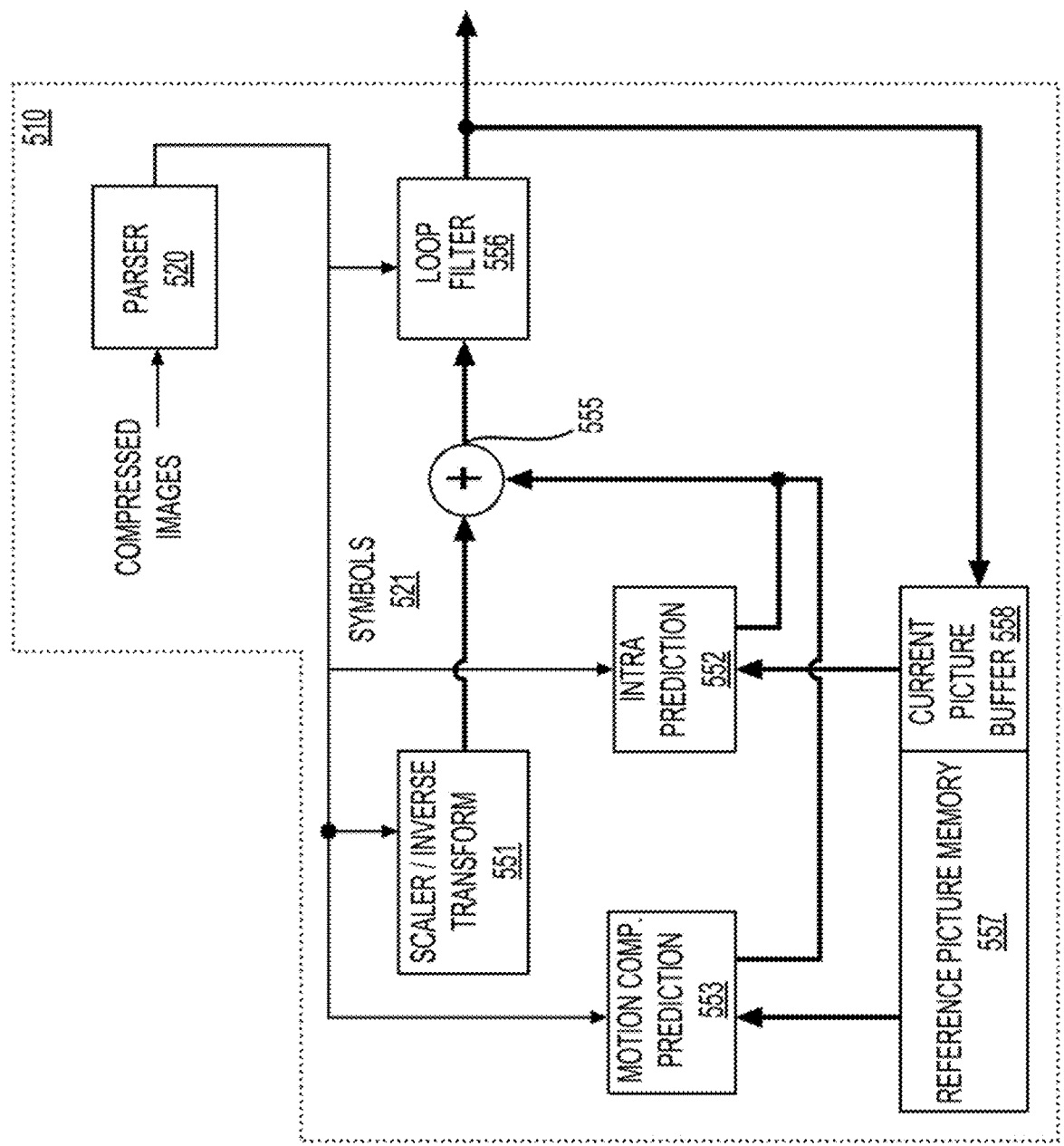
FIG. 5 is a schematic illustration of a simplified block diagram of a video decoder in accordance with an embodiment.

FIG. 5 shows a block diagram of a video decoder (510) according to an embodiment of the present disclosure. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth.

The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
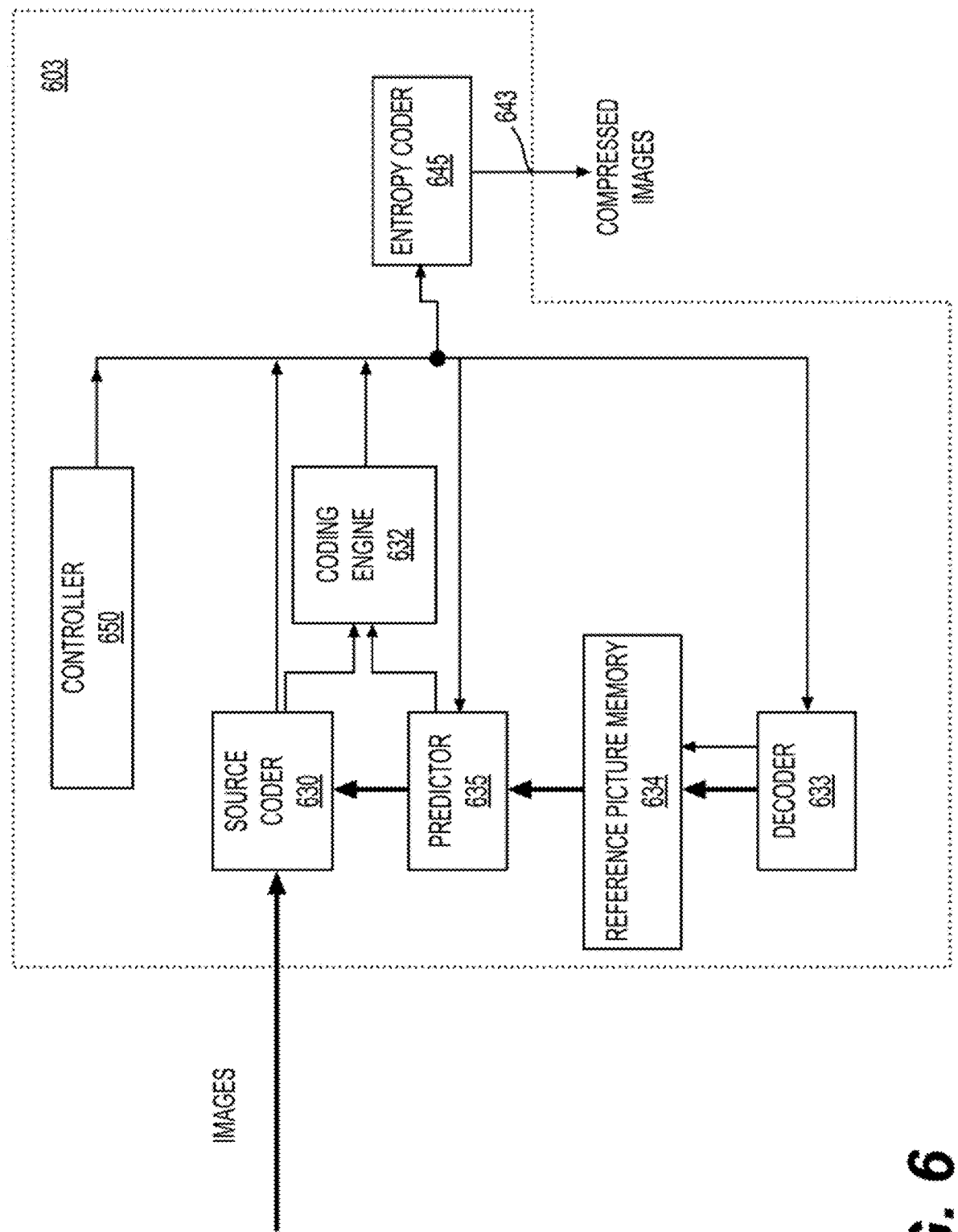
FIG. 6 is a schematic illustration of a simplified block diagram of a video encoder in accordance with an embodiment.

FIG. 6 shows a block diagram of a video encoder (603) according to an embodiment of the present disclosure. The video encoder (603) can be used in the V-PCC encoder (300) the compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block.

Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
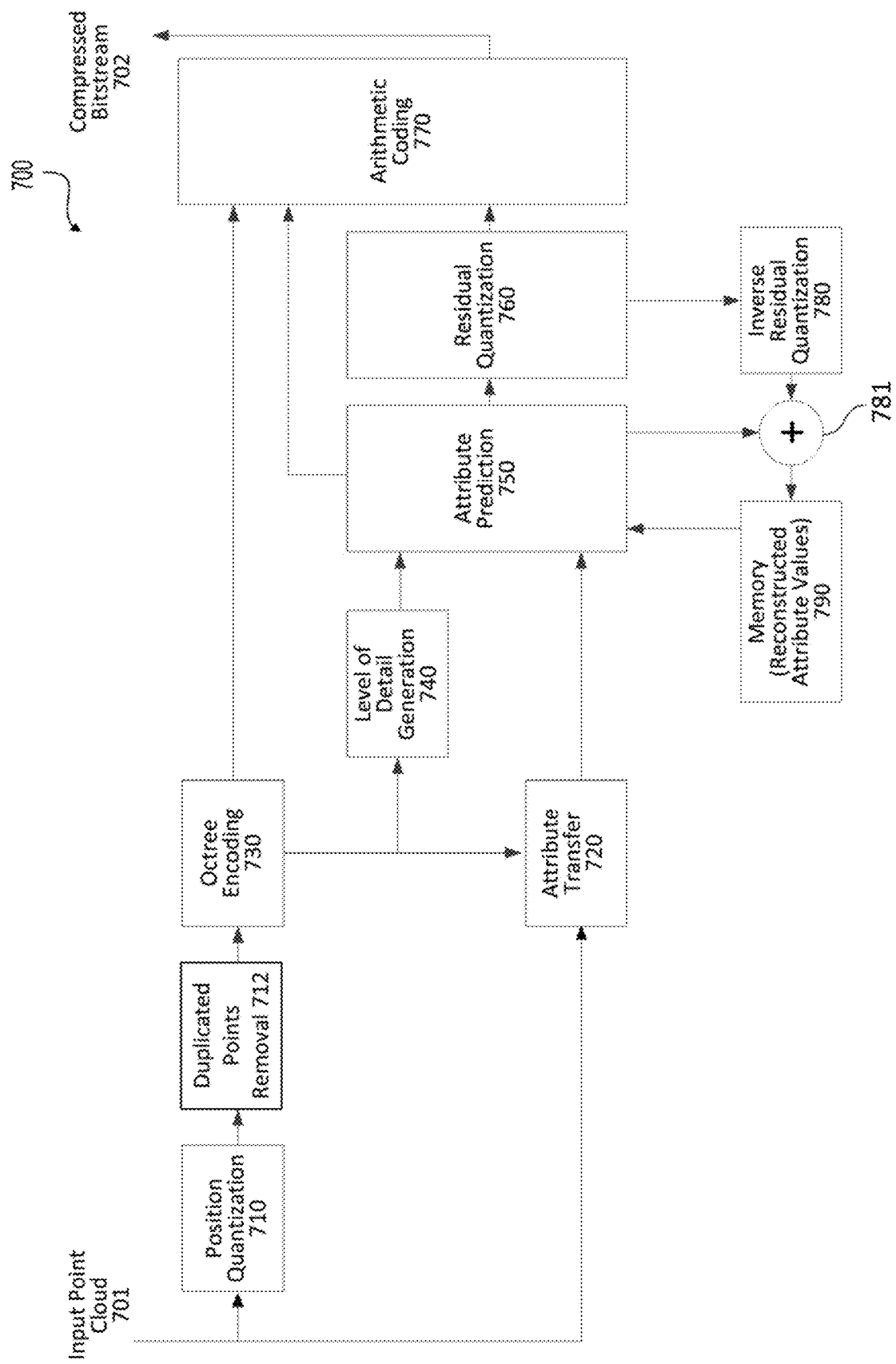
FIG. 7 shows a block diagram of an encoder for encoding point cloud frames, according to some embodiments.

FIG. 7 shows a block diagram of a G-PPC encoder (700) in accordance with an embodiment. The encoder (700) can be configured to receive point cloud data and compress the point cloud data to generate a bit stream carrying compressed point cloud data. In an embodiment, the encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the encoder (700). Positions (e.g., 3D coordinates) of the point cloud (701) are provided to the quantization module (710). The quantization module (710) is configured to quantize the coordinates to generate quantized positions. The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
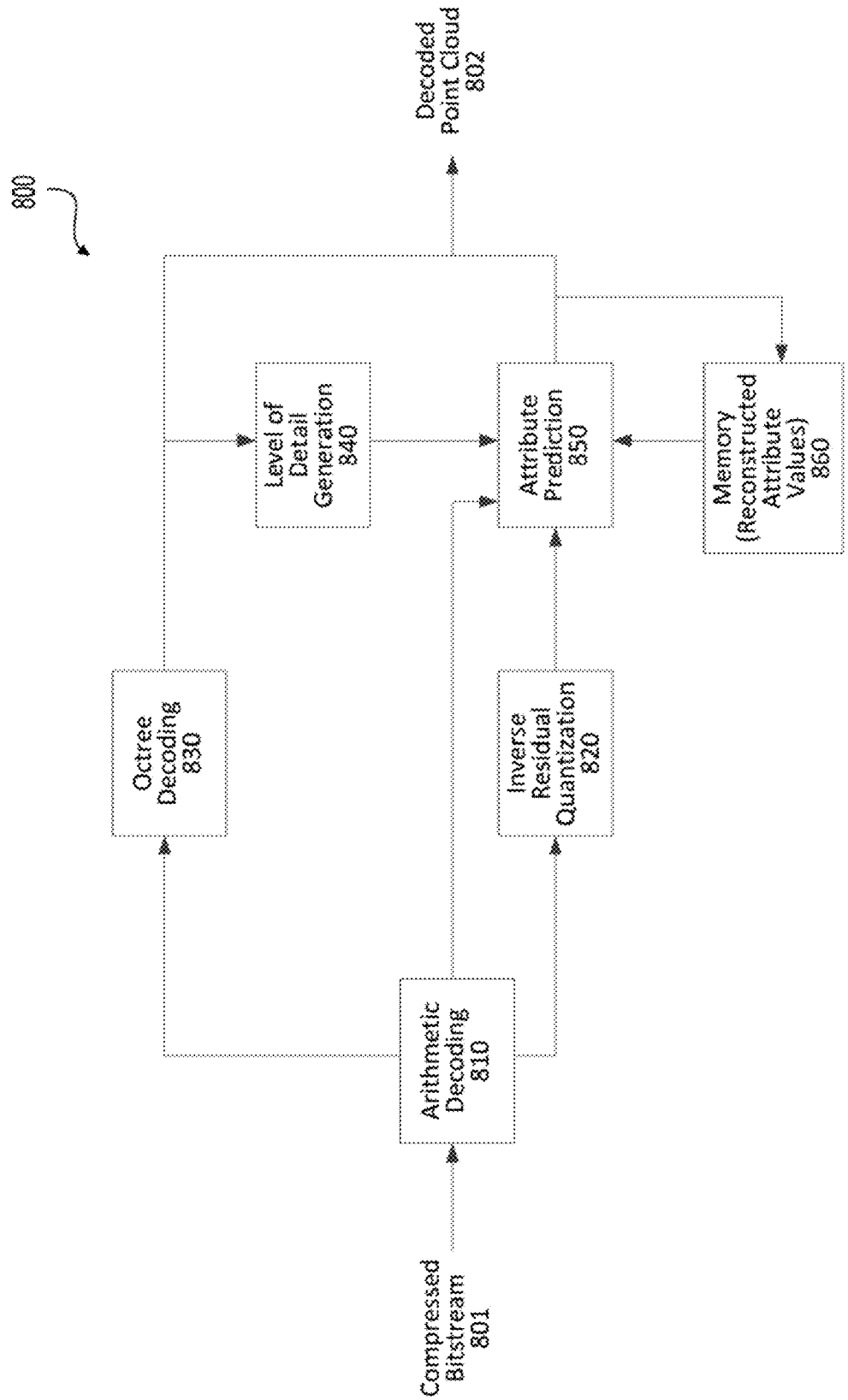
FIG. 8 shows a block diagram of a decoder for decoding a compressed bitstream corresponding to point cloud frames according to some embodiments.

FIG. 8 shows a block diagram of a G-PCC decoder (800) in accordance with an embodiment. The decoder (800) can be configured to receive a compressed bitstream and perform point cloud data decompression to decompress the bitstream to generate decoded point cloud data. In an embodiment, the decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). The attribute prediction module (850) can combine the attribute prediction with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, geometry octree structure can be used in PCC. In some related examples, the geometry octree structure is traversed in a breadth first order. According to the breadth first order, octree nodes in a current level can be visited after the octree nodes in an upper level have been visited. According to an aspect of the present disclosure, the breadth first order scheme is not suitable for parallel processing because the current level has to wait for the upper level to be coded. The present disclosure provides techniques to add depth first coding order in the coding order techniques for geometry octree structure. The depth first coding order can be combined with the breadth first order in some embodiments, or can be used by itself in some embodiments. The coding orders (e.g., depth first coding order, a combination of the depth first coding order and the breadth first coding order and the like) can be referred to as hybrid coding order for PCC in the present disclosure.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

According to some aspects of the disclosure, geometry information and the associated attributes of a point cloud, such as color, reflectance and the like can be separately compressed (e.g., in the Test Model 13 (TMC13) model). The geometry information of the point cloud, which includes the 3D coordinates of the points in the point cloud, can be coded by an octree partition with occupancy information of the partitions. The attributes can be compressed based on a reconstructed geometry using, for example, prediction, lifting and region adaptive hierarchical transform techniques techniques.

According to some aspects of the disclosure, a three dimensional space can be partitioned using octree partition. Octrees are the three dimensional analog of quadtrees in the two dimensional space. Octree partition technique refers to the partition technique that recursively subdivides three dimensional space into eight octants, and an octree structure refers to the tree structure that represents the partitions. In an example, each node in the octree structure corresponds to a three dimensional space, and the node can be an end node (no more partition, also referred to as leaf node in some examples) or a node with a further partition. A partition at a node can partition the three dimensional space represented by the node into eight octants. In some examples, nodes corresponding to partitions of a specific node can be referred to as child nodes of the specific node.

Figure 9:
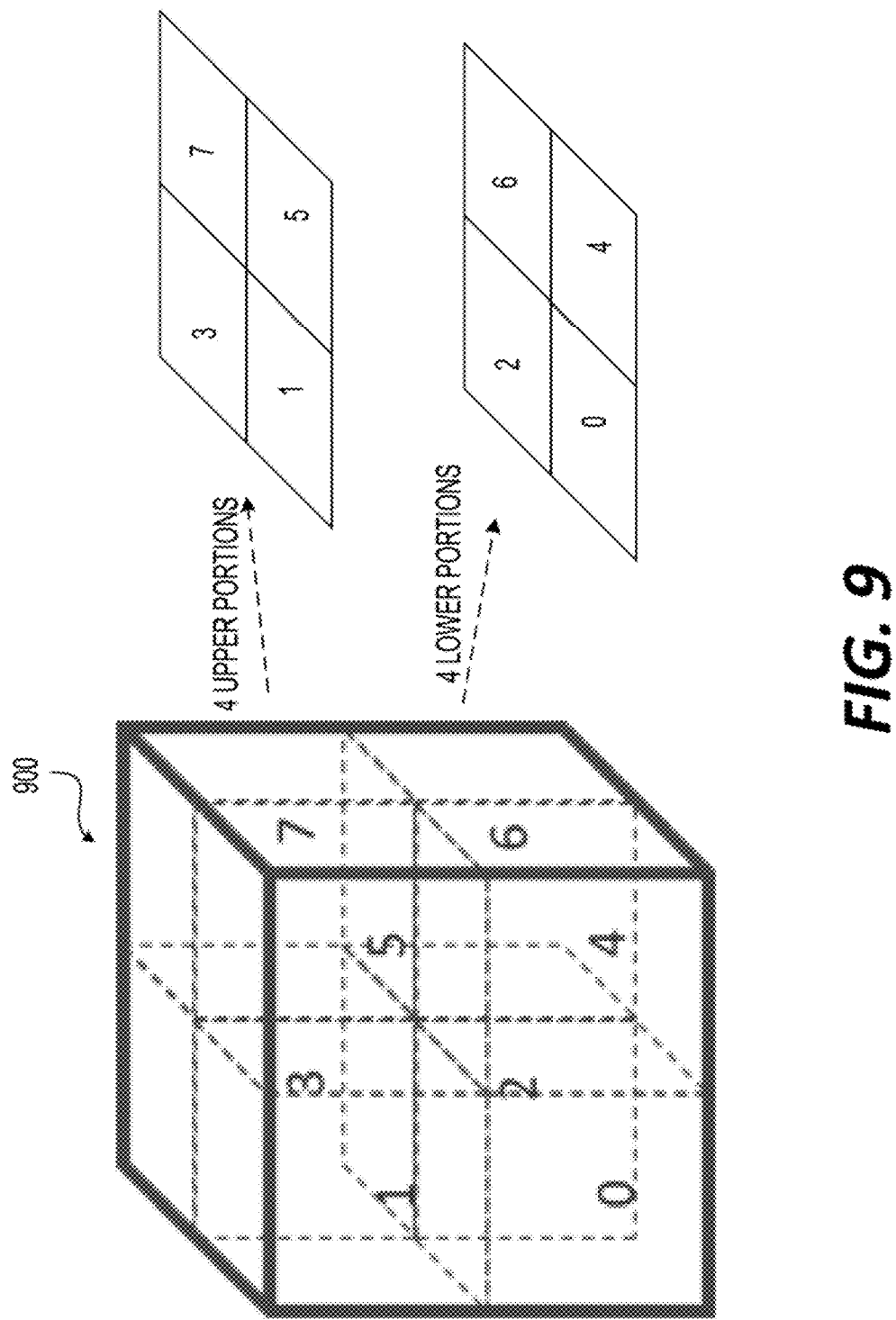
FIG. 9 shows a diagram illustrating a partition of a cube based on the octree partition technique according to some embodiments of the disclosure.

FIG. 9 shows a diagram illustrating a partition of a 3D cube (900) (corresponding to a node) based on the octree partition technique according to some embodiments of the disclosure. The partition can divide the 3D cube (900) into eight smaller equal-sized cubes 0-7 as shown in FIG. 9.

The octree partition technique (e.g., in TMC13) can recursively divide an original 3D space into the smaller units, and the occupancy information of every sub-space can be encoded to represent geometry positions.

In some embodiments (e.g., In TMC13), an octree geometry codec is used. The octree geometry codec can perform geometry encoding. In some examples, geometry encoding is performed on a cubical box. For example, the cubical box can be an axis-aligned bounding box B that is defined by two points (0,0,0) and ($2^{M-1}, 2^{M-1}, 2^{M-1}$), where $2^{M-1}$ defines the size of the bounding box B and M can be specified in the bitstream.

Then, an octree structure is built by recursively subdividing the cubical box. For example, the cubical box defined by the two points (0,0,0) and ($2^{M-1}, 2^{M-1}, 2^{M-1}$) is divided into 8 sub cubical boxes, then an 8-bit code, that is referred to as an occupancy code, is generated. Each bit of the occupancy code is associated with a sub cubical box, and the value of the bit is used to indicate whether the associated sub cubical box contains any points of the point cloud. For example, value 1 of a bit indicates that the sub cubical box associated with the bit contains one or more points of the point cloud; and value 0 of a bit indicates that the sub cubical box associated with the bit contains no point of the point cloud.

Further, for empty sub cubical box (e.g., the value of the bit associated with the sub cubical box is 0), no more division is applied on the sub cubical box. When a sub cubical box has one or more points of the point cloud (e.g., the value of the bit associated with the sub cubical box is 1), the sub cubical box is further divided into 8 smaller sub cubical boxes, and an occupancy code can be generated for the sub cubical box to indicate the occupancy of the smaller sub cubical boxes. In some examples, the subdivision operations can be repetitively performed on non-empty sub cubical boxes until the size of the sub cubical boxes is equal to a predetermined threshold, such as size being 1. In some examples, the sub cubical boxes with a size of 1 are referred to as voxels, and the sub cubical boxes that have larger sizes than voxels can be referred to as non-voxels.

Figure 10:
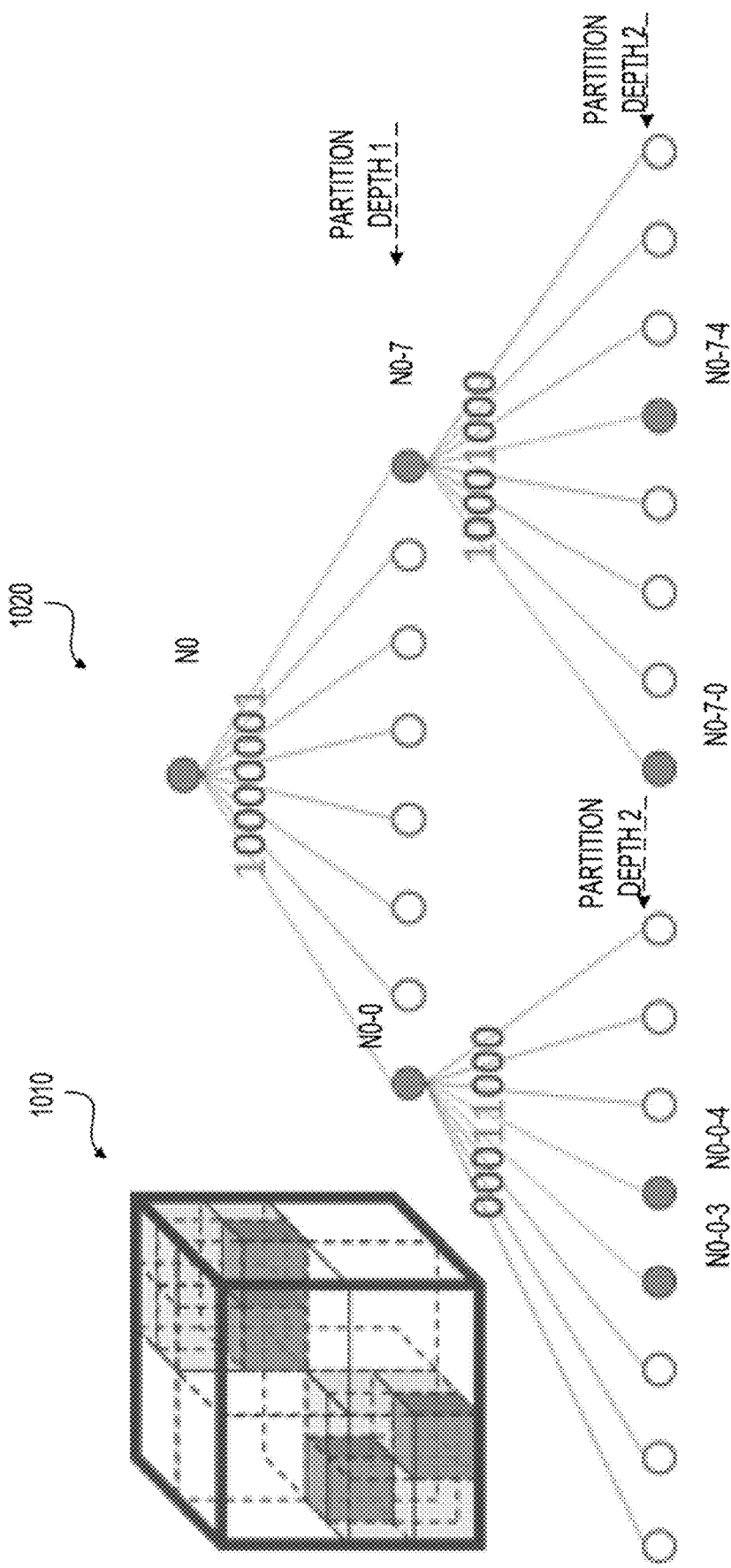
FIG. 10 shows an example of an octree partition and an octree structure corresponding to the octree partition according to some embodiments of the disclosure.

FIG. 10 shows an example of an octree partition (1010) and an octree structure (1020) corresponding to the octree partition (1010) according to some embodiments of the disclosure. FIG. 10 shows two levels of partitions in the octree partition (1010). The octree structure (1020) includes a node (N0) corresponding to the cubical box for octree partition (1010). At a first level, the cubical box is partitioned into 8 sub cubical boxes that are numbered 0-7 according to the numbering technique shown in FIG. 9. The occupancy code for the partition of the node N0 is "10000001" in binary, which indicates the first sub cubical box represented by node N0-0 and the eighth sub cubical box represented by node N0-7 includes points in the point cloud and other sub cubical boxes are empty.

Then, at the second level of partition, the first sub cubical box (represented by node N0-0) and the eighth sub cubical box (represented by node N0-7) are further respectively sub-divided into eight octants. For example, the first sub cubical box (represented by node N0-0) is partitioned into 8 smaller sub cubical boxes that are numbered 0-7 according to the numbering technique shown in FIG. 9. The occupancy code for the partition of the node N0-0 is "00011000" in binary, which indicates the fourth smaller sub cubical box (represented by node N0-0-3) and the fifth smaller sub cubical box (represented by node N0-0-4) includes points in the point cloud and other smaller sub cubical boxes are empty. At the second level, the seventh sub cubical box (represented by node N0-7) is similarly partitioned into 8 smaller sub cubical boxes as shown in FIG. 10.

In the FIG. 10 example, the nodes corresponding to non-empty cubical space (e.g., cubical box, sub cubical boxes, smaller sub cubical boxes and the like) are colored in grey, and referred to as shaded nodes.

According to some aspects of the disclosure, the occupancy codes can be suitably compressed using suitable coding techniques. In some embodiments, an arithmetic encoder is used to compress an occupancy code of a current node in the octree structure. The occupancy code can be denoted as S which is an 8-bit integer, and each bit in S indicates an occupancy status of a child node of the current node. In an embodiment, the occupancy code is encoded using a bit wise encoding. In another embodiment, the occupancy code is encoded using a byte wise encoding. In some examples (e.g., TMC13), the bit-wise encoding is enabled by default. Both of the bit wise encoding and the byte wise encoding can perform arithmetic coding with context modeling to encode the occupancy code. The context status can be initialized at the beginning of the whole coding process for the occupancy codes and is updated during the coding process of the occupancy codes.

In an embodiment of bit-wise encoding to encode an occupancy code for a current node, eight bins in S for the current node are encoded in a certain order. Each bin in S is encoded by referring to the occupancy status of neighboring nodes of the current code and/or child nodes of the neighboring nodes. The neighboring nodes are at the same level as the current node, and can be referred to as sibling nodes of the current node.

In an embodiment of byte wise encoding to encode an occupancy code for a current node, the occupancy code S (one byte) can be encoded by referring to: (1) an adaptive look up table (A-LUT), which keeps track of the P (e.g., 32) most frequent used occupancy codes; and (2) a cache which keeps track of the last different observed Q (e.g., 16) occupancy codes.

In some examples for byte wise encoding, a binary flag indicating whether S is in the A-LUT or not is encoded. If S is in the A-LUT, the index in the A-LUT is encoded by using a binary arithmetic encoder. If S is not in the A-LUT, then a binary flag indicating whether S is in the cache or not is encoded. If S is in the cache, then the binary representation of its index in the cache is encoded by using a binary arithmetic encoder. Otherwise, if S is not in the cache, then the binary representation of S is encoded by using a binary arithmetic encoder.

In some embodiments, at a decoder side, a decoding process can start by parsing the dimensions of a bounding box from the bitstream. The bounding box is indicative of the cubical box corresponding to a root node in the octree structure for partitioning the cubical box according to geometry information of the point cloud (e.g., occupancy information for points in the point cloud). The octree structure is then built by subdividing the cubical box according to the decoded occupancy codes.

In some related examples, (e.g., a version of TMC13), to code the occupancy codes, the octree structure is traversed in the breadth first order. According to the breadth first order, octree nodes (nodes in the octree structure) in a level can be visited after all of the octree nodes in an upper level have been visited. In an implementation example, a first-in-first-out (FIFO) data structure can be used.

Figure 11:
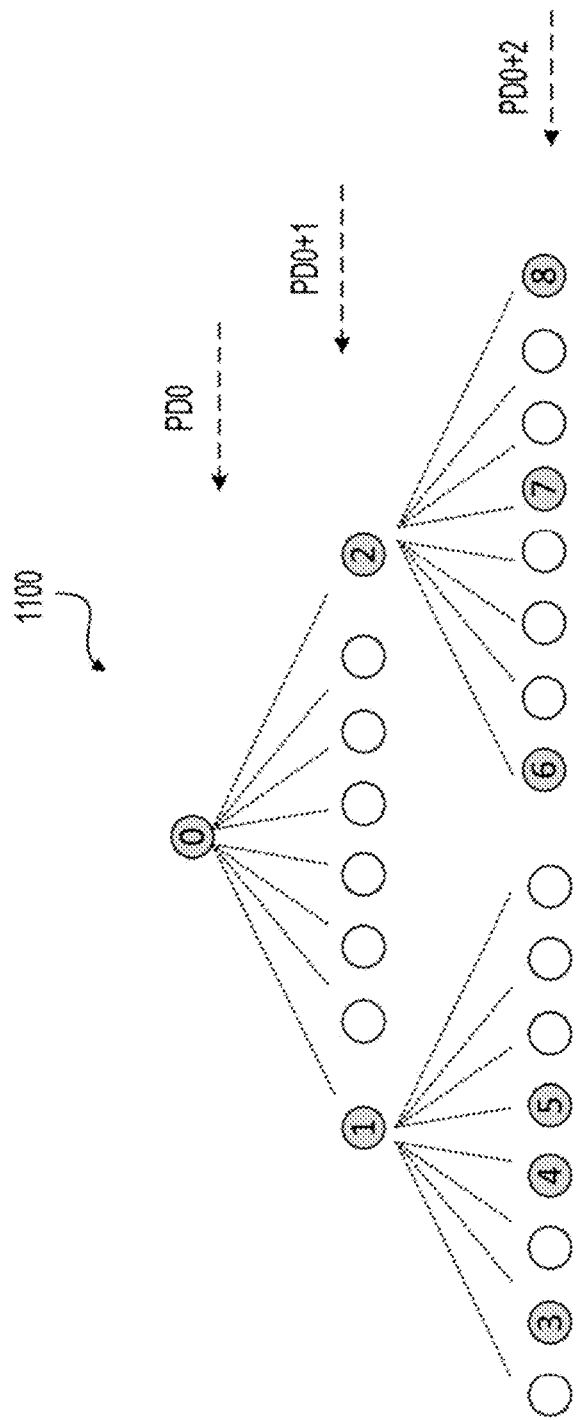
FIG. 11 shows a diagram of an octree structure illustrating breadth first coding order.

FIG. 11 shows a diagram of an octree structure (1100) illustrating breadth first coding order. The shaded nodes in the octree structure (1100) are nodes corresponding to cubical spaces that are not empty. The occupancy codes for the shaded nodes can be coded in the breadth first coding order from 0 to 8 shown in FIG. 11. In the breadth first coding order, the octree nodes are visited level-by-level. The breadth first coding order by itself is not suitable for parallel processing because the current level has to wait for the upper level to be coded.

Some aspects of the disclosure provide a hybrid coding order that includes at least one level that is coded using a depth first coding order instead of the breadth first coding order. Thus, in some embodiments, a node at the level with the depth first coding order and descendant nodes of the node can form a sub octree structure of the octree structure. When the level with depth first coding order includes multiple nodes respectively corresponding to non-empty cubical spaces, the multiple nodes and their corresponding descendant nodes can form multiple sub octree structures. The multiple sub octree structures can be coded in parallel in some embodiments.

Figure 12:
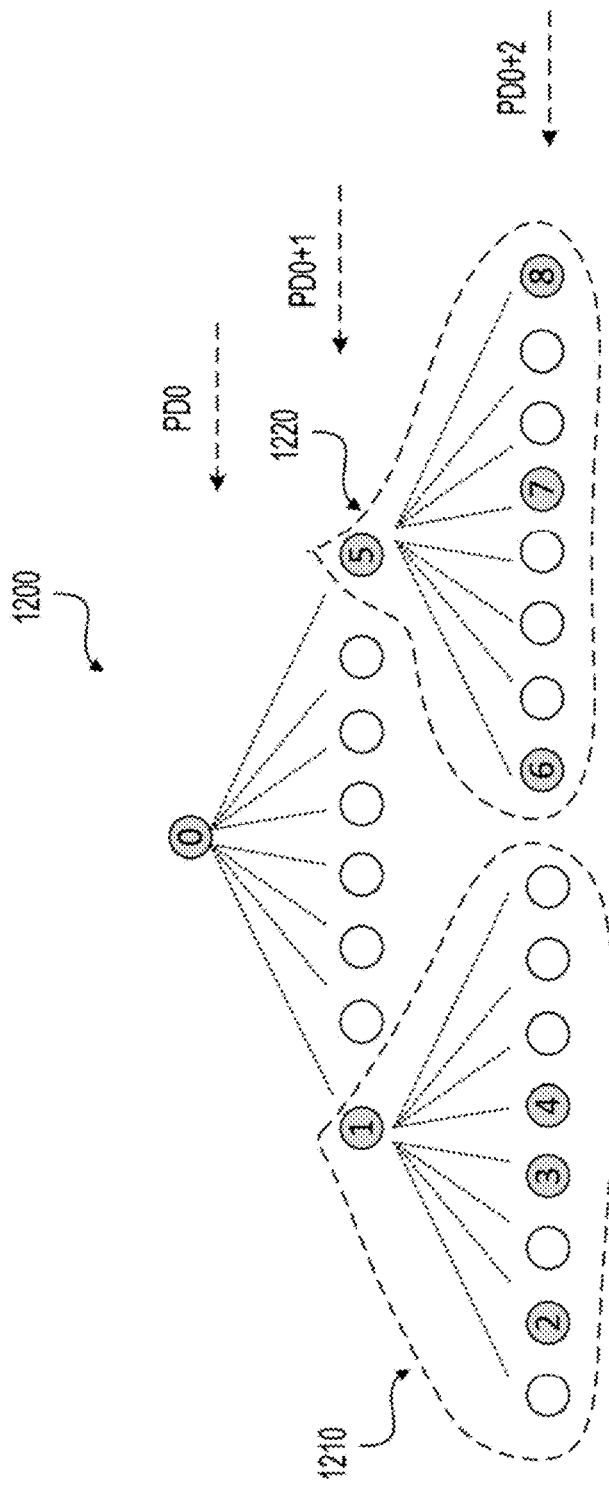
FIG. 12 shows a diagram of an octree structure illustrating depth first coding order.

FIG. 12 shows a diagram of an octree structure (1200) illustrating depth first coding order. The shaded nodes in the octree structure (1200) are nodes corresponding to cubical spaces that are not empty. The octree structure (1200) can correspond to same occupancy geometry of a point cloud as the octree structure (1100). The occupancy codes for the shaded nodes can be coded in the depth first coding order from 0 to 8 shown in FIG. 12.

In the FIG. 12 example, node "0" can be at any suitable partition depth, such as PD0, child nodes of the node "0" are at the partition depth PD0+1, and grandchild nodes of the node "0" are at the partition depth PD0+2. In the FIG. 12 example, nodes at partition depth PD0+1 can be coded in a depth first coding order. The nodes at the partition depth PD0+1 include two nodes that correspond to non-empty space. The two nodes and their respectively descendant nodes can form a first sub octree structure (1210) and a second sub octree structure (1220), the two nodes can be respectively referred to as root nodes of the two sub octree structures.

The depth first coding order in FIG. 12 is referred to as a preorder version of the depth first coding order. In the preorder version of the depth first coding order, for each sub octree structure, the root node of the sub octree is visited first before visiting the child nodes of the sub octree structure. Further, the deepest node is first visited and then track back to the siblings of the parent node.

In the FIG. 12 example, the first sub octree structure (1210) and the second sub octree structure (1220) can be coded in parallel processing in some implementations. For example, node 1 and node 5 can be visited at the same time. In some examples, recursion programming or stack data structure can be used to implement the depth first coding order.

In some embodiments, the hybrid coding order starts with the breadth first traversing (coding), and after several levels of breadth first traversing, the depth-first traversing (coding) can be enabled.

It should be noted that the hybrid coding order can be used in any suitable PCC system, such as the TMC13 based PCC system, MPEG-PCC based PCC system, and the like.

According to an aspect of the disclosure, the hybrid coding order can include both breadth first coding order and depth first coding order for coding geometry information of a point cloud. In an embodiment, a node size for nodes in the octree structure to change from breadth first coding order to depth first coding order can be specified. In an example, during PCC, the coding of the octree structure starts with breadth first coding order, and at a level with node size being equal to the specified node size for coding order change, the coding order can change to the depth first coding order at the level. It is noted that node size is associated with partition depth in some examples.

In another embodiment, a node size for nodes in the octree structure to change from depth first coding order to breadth first coding order can be specified. In an example, during PCC, the coding of the octree structure starts with depth first coding order, and at a level with node size being equal to the specified node size for coding order change, the coding order can change to the breadth first coding order. It is noted that node size is associated with partition depth in some examples.

More specifically, in the embodiment of starting with breadth first coding order, the node size can be represented in log 2 scale, and is denoted by d=0, 1, . . . , M−1, where M−1 is the node size of the root node and M is the maximum number of octree partition depths (also referred to as levels in some examples). Further, a parameter $d_t$ that is referred to as a coding order change size can be defined. In an example, the parameter $d_t$ ($1 \leq d_t \leq M-1$), is used to specify that the breadth-first order is applied to the nodes from the size of M−1 to $d_t$ and the depth-first order is applied to the nodes from the size of $d_t-1$ to 0. When $d_t=M-1$, the depth-first scheme applied to all the octree nodes from the root node. When $d_t=1$, the octree structure is coded using breadth first coding order only.

In some embodiments, the coding order for the octree structure can start with breadth first coding order, then at a specific depth (corresponding to specific node size), each node at the specific depth and the descendant nodes of the node form a separate sub octree structure of the point cloud. Thus, at the specific depth, multiple sub octree structures are formed. The sub octree structures can be separately coded using any suitable coding mode. In an example, a sub octree structure can be coded using depth first coding order. In another example, a sub octree structure can be coded using breadth first coding order. In another example, a sub octree structure can be coded using a hybrid coding order. In another example, occupancy codes in a sub octree structure can be coded using bit wise coding scheme. In another example, occupancy codes in a sub octree structure can be coded using byte wise coding scheme. In another example, a sub octree structure can be coded using predictive geometry coding technique which is an alternative coding mode of depth-first octree coding mode. The predictive geometry coding technique can predict points based on previously coded neighboring points with coded corrective vectors in some examples.

In some embodiments, at the encoder side, for each sub octree structure, the encoder can select a coding mode from multiple coding modes based on coding efficiencies. For example, a selected coding mode for a sub octree structure can achieve the best coding efficiency for the sub octree structure. Then, the encoder can use respectively selected coding modes for the sub octree structures to respectively code the sub octree structures. In some embodiments, the encoder can signal an index for a sub octree structure in the bitstream and the index is indicative of the selected coding mode for the sub octree structure. At the decoder side, the decoder can determine the coding mode for a sub octree structure based on the index in the bitstream and then decode sub octree structure according to the coding mode.

Aspects of the present disclosure also provide signaling techniques for the hybrid coding order. According to an aspect of the disclosure, controlling parameters to be used in the hybrid coding order can be signaled in high level syntax, such as sequence parameter set (SPS), slice header, geometry parameter set of the bitstream, and the like. It is noted that specific examples are provided in the following description. The disclosed techniques illustrated by the specific examples are not limited to the specific examples, and can be suitably adjusted and used in other examples.

In an embodiment, the parameter $d_t$ (the coding order change size) is specified in the high-level syntax.

FIG. 13 shows a syntax example (1300) of geometry parameter set according to some embodiments of the disclosure. As shown by (1310), gps_depth_first_node_size_log 2_minus_1 is specified in the geometry parameter set. The parameter $d_t$ can be determined based on gps_depth_first_node_size_log 2_minus_1, for example, according to (Eq. 1).

$$d_t = gps\_depth\_first\_node\_size\_log\ 2\_minus\_1 + 1 \quad (Eq.\ 1)$$

It is noted that when gps_depth_first_node_size_log 2_minus_1 equals to 0, the depth first coding order is disabled.

In another embodiment, a control flag is explicitly signaled to indicate whether hybrid coding order is used.

FIG. 14 shows another syntax example (1400) of geometry parameter set according to some embodiments of the disclosure. As shown by (1410), a control flag that is denoted by gps_hybrid_coding_order_flag is used. When the control flag gps_hybrid_coding_order_flag is true (e.g., has value 1), the hybrid coding order scheme is enabled; when gps_hybrid_coding_order_flag is false (e.g., has value 0), the hybrid coding order scheme is disabled. When gps_hybrid_coding_order_flag is true (e.g., has value 1), the parameter $d_t$ can be determined based on gps_depth_first_node_size_log 2_minus_2, for example, according to (Eq. 2):

$$d_t = gps\_depth\_first\_node\_size\_log\ 2\_minus2 + 2 \quad (Eq.\ 2)$$

When gps_hybrid_coding_order_flag is false (e.g., has value 0), $d_t$ is set to 1 by default to indicate the depth-first coding order is disabled and only the breadth-first coding order is applied in an example.

In an embodiment, when the hybrid coding order is enabled, the breadth-first order is applied to the nodes from the size of M−1 to $d_t$ and the depth-first order is applied to the nodes from the size of $d_t$−1 to 0.

FIG. 15 shows a pseudo code example (1500) for octree coding according to some embodiments of the disclosure. As shown by (1510), when depth>=MaxGeometryOctreeDepth−$d_t$, depth first coding order can be used. In the FIG. 15 example, the pseudo code "geometry_node_depth_first" can be applied for depth first coding order.

FIG. 16 shows a pseudo code example (1600) for depth first coding order according to some embodiments of the disclosure. The pseudo code "geometry_node_depth_first" is a recursive function. In the recursive function, "geometry_node" function is first invoked to obtain the occupancy code for current octree node, and then the pseudo code "geometry_node_depth_first" is invoked by itself to code each child node until reaching the leaf nodes, for example, when depth>=MaxGeometryOctreeDepth−1.

Figure 17:
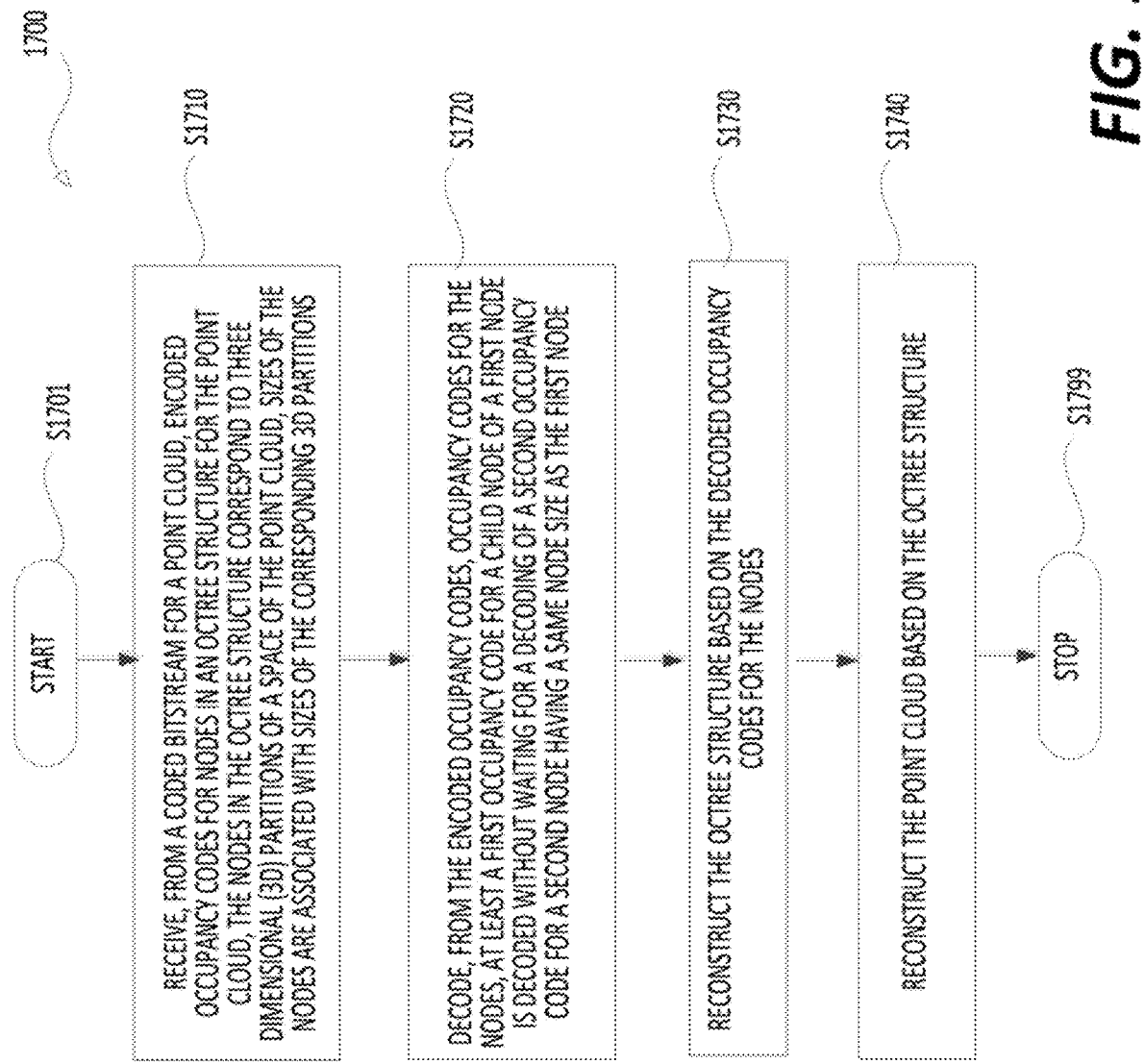
FIG. 17 shows a flow chart outlining a process example in accordance with some embodiments.

FIG. 17 shows a flow chart outlining a process (1700) according to an embodiment of the disclosure. The process (1700) can be used during a coding process for point clouds. In various embodiments, the process (1700) is executed by processing circuitry, such as the processing circuitry in the terminal devices (110), the processing circuitry that performs functions of the encoder (203) and/or the decoder (201), the processing circuitry that performs functions of the encoder (300), the decoder (400), the encoder (700), and/or the decoder (800), and the like. In some embodiments, the process (1700) is implemented in software instructions, thus when the processing circuitry executes the software instructions, the processing circuitry performs the process (1700). The process starts at (S1701) and proceeds to (S1710).

At (S1710), a coded bitstream for a point cloud is received. The coded bistream includes geometry information in the form of encoded occupancy codes for nodes in an octree structure for the point cloud. The nodes in the octree structure correspond to three dimensional (3D) partitions of a space of the point cloud. Sizes of the nodes are associated with sizes of the corresponding 3D partitions.

At (S1720), occupancy codes for the nodes are decoded from the encoded occupancy codes. At least a first occupancy code for a child node of a first node is decoded without waiting for a decoding of a second occupancy code for a second node having a same node size as the first node.

In an embodiment, the child node is among a first set of nodes (first descendant nodes) in a first sub octree with the first node being a root of the first sub octree. The first node and the second node are sibling nodes of the same node size. The second node is the root node of a second sub octree that includes a second set of nodes (second descendant nodes). Then, in some examples, a first set of occupancy codes for the first set of nodes and a second set of occupancy codes for the second set of nodes can be decoded separately. In an example, the first set of occupancy codes for the first set of nodes and the second set of occupancy codes for the second set of nodes can be decoded in parallel. In another example, the first set of occupancy codes for the first set of nodes is decoded using a first coding mode and the second set of occupancy codes for the second set of nodes is decoded using a second coding mode.

The first coding mode and the second coding mode can use any of a depth first coding order, a breadth first coding order, a predictive geometry coding technique and the like. In some examples, the coded bitstream includes a first index that is indicative of the first coding mode for the first sub octree and a second index that is indicative of the second coding mode for the second sub octree.

In another embodiment, the first node and the second node are of a specific node size for coding order change. In some examples, larger nodes in the nodes are coded using a first coding order, and smaller nodes in the nodes are coding using a second coding order. The node sizes of the larger nodes are larger than a specific node size for coding order change. The node sizes of the smaller nodes are equal or smaller than the specific node size for coding order change. In an example, the first coding order is breadth first coding order and the second coding order is depth first coding order. In another example, the first coding order is depth first coding order and the second coding order is breadth first coding order.

In some examples, the specific node size for coding order change is determined based on a signal in the coded bitstream for the point cloud. In some examples, the signal is provided when a control signal is indicative of a change of coding order.

At (S1730), the octree structure can be reconstructed based on the decoded occupancy codes for the nodes.

At (S1740), the point cloud is reconstructed based on the octree structure. Then, the process proceeds to (S1799) and terminates.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
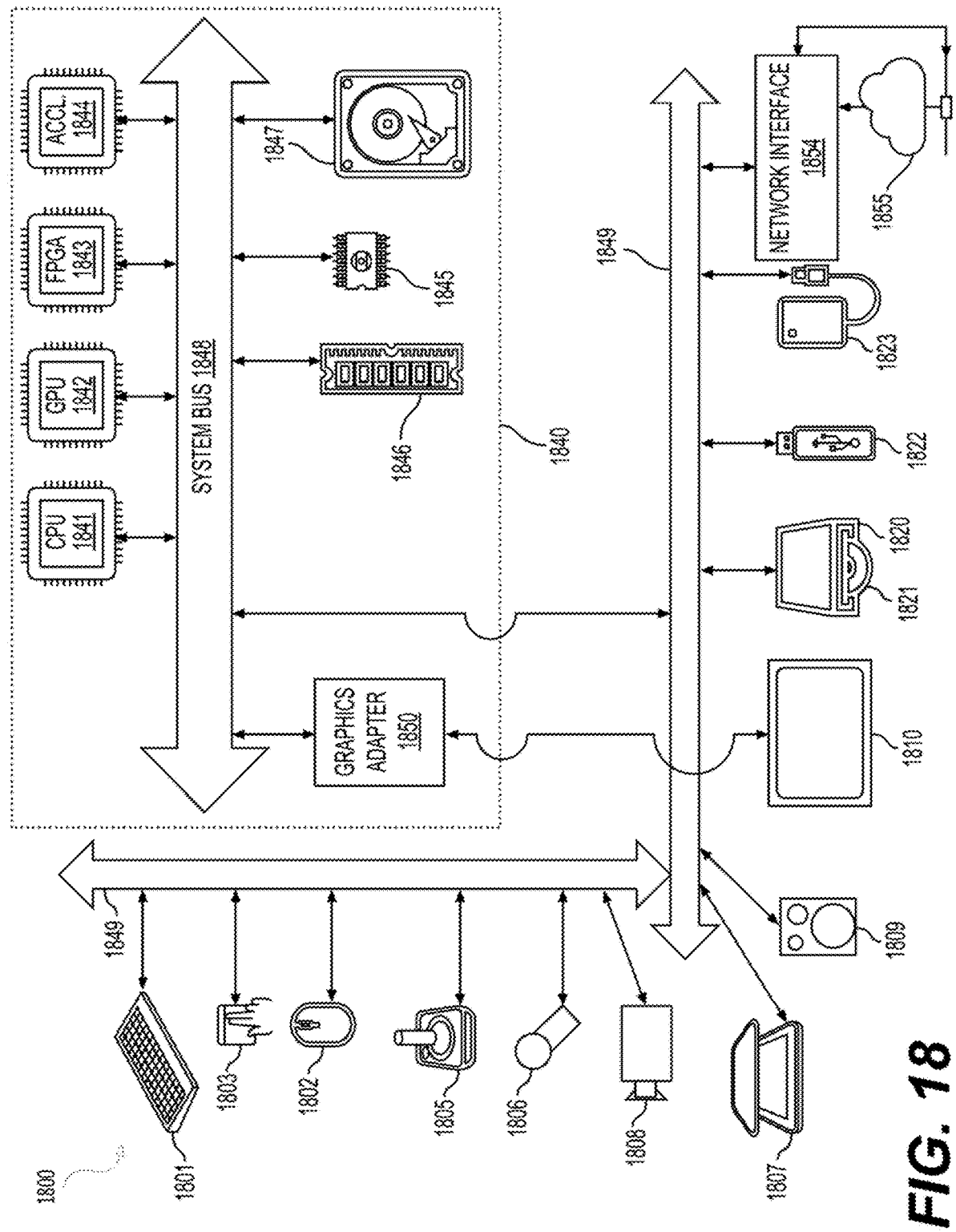
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smartphone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for point cloud decoding, comprising:
   receiving a coded bitstream for a point cloud, the coded bitstream including encoded data for nodes in an octree structure for the point cloud, the nodes in the octree structure corresponding to three dimensional (3D) partitions of a space of the point cloud, node sizes of the nodes being associated with sizes of the corresponding 3D partitions of the nodes;
   decoding, from the coded bitstream, a first set of occupancy codes for a first set of nodes in the nodes using one of a breadth first coding order or a depth first coding order;
   based on a change of coding order signal included in the coded bitstream, changing from decoding using the one of the breadth first coding order or the depth first coding order to decoding, from the coded bitstream, a second set of occupancy codes for a second set of nodes in the nodes using the other of the breadth first coding order or the depth first coding order; and
   reconstructing the octree structure based on at least the first set of occupancy codes and the second set of occupancy codes,
   wherein first node sizes of the first set of nodes are greater than or equal to a threshold node size, and second node sizes of the second set of nodes are less than the threshold node size.

2. The method of claim 1, wherein the second set of nodes form a first sub octree with a first root node, and the method further comprises:
   decoding, from the coded bitstream, a third set of occupancy codes for a third set of nodes in the nodes, the third set of nodes forming a second sub octree with a second root node, the first root node and the second root node being of a same node size.

3. The method of claim 2, wherein:
   the decoding the second set of occupancy codes for the second set of nodes of the first sub octree is in parallel with the decoding the third set of occupancy codes for the third set of nodes of the second sub octree.

4. The method of claim 2, wherein:
   the decoding the second set of occupancy codes includes decoding, based on the other of the breadth first coding order or the depth first coding order, the second set of occupancy codes for the second set of nodes in the first sub octree; and
   the decoding the third set of occupancy codes includes decoding, based on the one of the breadth first coding order or the depth first coding order, the third set of occupancy codes for the third set of nodes in the second sub octree.

5. The method of claim 4, further comprising:
   decoding, from the coded bitstream, a first index that is indicative of the other of the breadth first coding order or the depth first coding order for the first sub octree; and
   decoding, from the coded bitstream, the change of coding order signal comprising a second index that is indicative of the one of the breadth first coding order or the depth first coding order for the second sub octree.

6. The method of claim 1, further comprising:
   determining the threshold node size based on coded information in the coded bitstream for the point cloud.

7. An apparatus for point cloud encoding, comprising: processing circuitry configured to:
   generate a coded bitstream for a point cloud, the coded bitstream including encoded data for nodes in an octree structure for the point cloud, the nodes in the octree structure corresponding to three dimensional (3D) partitions of a space of the point cloud, node sizes of the nodes being associated with sizes of the corresponding 3D partitions of the nodes, the coded bitstream is generated by
      encoding, in the coded bitstream, a first set of occupancy codes for a first set of nodes in the nodes using one of a breadth first coding order or a depth first coding order;
      including a change of coding order signal in the coded bitstream, and changing from encoding using the one of the breadth first coding order or the depth first coding order to encode, in the coded bitstream, a second set of occupancy codes for a second set of nodes in the nodes using the other of the breadth first coding order or the depth first coding order; and encode the octree structure based on at least the first set of occupancy codes and the second set of occupancy codes, wherein first node sizes of the first set of nodes are greater than or equal to a threshold node size, and second node sizes of the second set of nodes are less than the threshold node size.

8. The apparatus of claim 7, wherein the second set of nodes form a first sub octree with a first root node, the processing circuitry is configured to:

encode, in the coded bitstream, a third set of occupancy codes for a third set of nodes in the nodes, the third set of nodes forming a second sub octree with a second root node, the first root node and the second root node being of a same node size.

9. The apparatus of claim 8, wherein:

the second set of occupancy codes for the second set of nodes of the first sub octree is encoded in parallel with the third set of occupancy codes for the third set of nodes of the second sub octree.

10. The apparatus of claim 8, wherein the processing circuitry is configured to:

encode, based on the other of the breadth first coding order or the depth first coding order, the second set of occupancy codes for the second set of nodes in the first sub octree; and encode, based on the one of the breadth first coding order or the depth first coding order, the third set of occupancy codes for the third set of nodes in the second sub octree.

11. The apparatus of claim 10, wherein the processing circuitry is configured to:

encoding, in the coded bitstream, a first index that is indicative of the other of the breadth first coding order or the depth first coding order for the first sub octree; and encoding, in the coded bitstream, the change of coding order signal comprising a second index that is indicative of the one of the breadth first coding order or the depth first coding order for the second sub octree.

12. The apparatus of claim 7, wherein the processing circuitry is configured to:

indicate the threshold node size in the coded bitstream for the point cloud.

13. A method of processing visual media data, the method comprising:

processing a bitstream of the visual media data according to a format rule, wherein the bitstream includes encoded data for nodes in an octree structure for a point cloud, the nodes in the octree structure corresponding to three dimensional (3D) partitions of a space of the point cloud, node sizes of the nodes being associated with sizes of the corresponding 3D partitions of the nodes, the format rule specifies that a first set of occupancy codes for a first set of nodes in the nodes is decoded from the bitstream using one of a breadth first coding order or a depth first coding order;

based on a change of coding order signal included in the bitstream, decoding using the one of the breadth first coding order or the depth first coding order is changed to decoding, from the bitstream, a second set of occupancy codes for a second set of nodes in the nodes using the other of the breadth first coding order or the depth first coding order, the octree structure is reconstructed based on at least the first set of occupancy codes and the second set of occupancy codes, and first node sizes of the first set of nodes are greater than or equal to a threshold node size, and second node sizes of the second set of nodes are less than the threshold node size.

* * * * *